United States Patent [19]

Padgett et al.

[11] Patent Number: 5,781,293
[45] Date of Patent: Jul. 14, 1998

[54] FOURIER TRANSFORM SPECTROMETER UTILIZING A BIREFRINGENT OPTICAL COMPONENT

[75] Inventors: John Miles Padgett, Boarhills, Scotland; Alan James Duncan, Dunblane, United Kingdom; Wilson Sibbett; Andrew Robert Harvey, both of St. Andrews, Scotland

[73] Assignee: Siemens Plc., Berkshire, England

[21] Appl. No.: 586,671

[22] PCT Filed: Jul. 11, 1994

[86] PCT No.: PCT/GB94/01499

§ 371 Date: Apr. 17, 1996

§ 102(e) Date: Apr. 17, 1996

[87] PCT Pub. No.: WO95/02171

PCT Pub. Date: Jan. 19, 1995

[30] Foreign Application Priority Data

Jul. 10, 1993 [GB] United Kingdom ............ 9314302

[51] Int. Cl.[6] ........................................ G01B 9/02
[52] U.S. Cl. ................................. 356/346; 356/351
[58] Field of Search ........................... 356/351, 346

[56] References Cited

U.S. PATENT DOCUMENTS

| 4,320,973 | 3/1982 | Fortunato et al. ............ 356/351 |
| 5,179,424 | 1/1993 | Lequime et al. ............. 356/351 |

*Primary Examiner*—Samuel A. Turner
*Attorney, Agent, or Firm*—Louis Weinstein

[57] ABSTRACT

A Fourier-transform spectrometer contains a birefringent optical component, removing the need for a Michelson interferometer used in conventional instruments. A suitable birefringent element such as a Wollaston prism, is used to introduce a path difference between two light polarisations. Use of an extended light source so that all areas of the birefringent component are illuminated simultaneously ensures that different positions on the birefringent component correspond to different path differences between the two polarisations. A Fourier-transform of the resulting interferogram at the detector results in the spectral distribution of the input light being obtained. The use of an extended light source permits a Fourier-transform spectrometer with no moving parts to be achieved.

12 Claims, 6 Drawing Sheets

$$\text{FIELD ANGLE} < \sqrt{\frac{W}{10 dt} \times \frac{2n_o^2 n_e}{n_e^2 - n_o^2}}$$

FOURIER TRANSFORM SPECTROMETER UTILIZING A BIREFRINGENT OPTICAL COMPONENT

FIELD OF THE INVENTION

This invention concerns spectrometers, particularly Fourier-transform spectrometers.

BACKGROUND OF THE INVENTION

Conventional Fourier-transform spectrometers are based on Michelson interferometer arrangements.

In a Fourier-transform spectrometer input light is divided into two arms by a beam splitter. If the output of the interferometer is recorded as a function of the path difference between the two arms, an interferogram is obtained. The power spectrum of the Fourier-transform of the interferogram corresponds to the spectral distribution of the input light.

The resolution of a Fourier-transform spectrometer depends on the maximum path difference between the two arms.

$$\text{Frequency Resolution} = \frac{\text{speed of light}}{\text{maximum path difference}}$$

The shortest wavelength that can be unambiguously measured depends both on the maximum path difference and the number of data points recorded across the interferogram.

$$\text{Shortest wavelength} = \frac{2 \times \text{maximum path difference}}{\text{no. of data points}}.$$

Most Fourier-transform spectrometers are designed for operation in the infra-red (1–10 um) and have resolutions of 10's–100's GHz.

Conventional Fourier-transform interferometer using a Michelson interferometer have a moving mirror in one arm to introduce the path difference and an internal HeNe laser to measure it. As such the mechanical quality of the movement is critical to the performance of the instrument. In addition, a conventional instrument requires a finite time over which to scan the mirror and thereby record a spectrum.

OBJECT OF THE INVENTION

It is an object of the invention to provide an improved Fourier-transform spectrometer.

SUMMARY OF THE INVENTION

According to one aspect of the present invention, the Michelson interferometer in a Fourier-transform spectrometer is replaced by a birefringent optical component.

Birefringent materials exhibit a refractive index that depends on the polarisation of the incident light. Therefore, by using a birefringent component in the path of a polarised beam of light it is possible to introduce a path difference between two light beams following the same path.

A basic implementation of a birefringent component within a Fourier-transform spectrometer is later described with reference to FIG. 3 of the accompanying drawings.

Preferably the incident light is polarised at 45° to the fast and slow axes of the birefringent component. This divides the light equally between the "fast" and "slow" polarisation components. The path difference introduced between the two polarisations depends in part on the lateral position of the birefringent component. One suitable birefringement component is a Wollaston prism, as later described with reference to FIG. 4 of the accompanying drawings.

The path difference between the two polarisation components is given by:

Path difference = $2d(n_e - n_o)\tan \theta$ where $n_e$ and $n_o$ are the extraordinary and ordinary refractive indices of the birefringement materials, $\theta$ is the internal angle of the interface, and d is the lateral displacement from the centre of the prism.

By translating the Wollaston prism the path difference between the two polarisations can be varied. To obtain an interferogram between the two polarisations a second polariser, also at 45°, may be used to extract a common polarisation component. As before, a Fourier-transform of the interferogram gives the spectral content of the input light.

According to a second aspect of the invention, the requirement for any moving parts within a Fourier-transform spectrometer is removed by using an extended light source so that all areas of the birefringent component are illuminated simultaneously. Different positions on the birefringent component thus correspond to different path differences between the two polarisations.

By providing an array of detectors the entire interference pattern corresponding to all the different path differences can be recorded simultaneously. Again a Fourier-transform of the interferogram will give the spectral distribution of the input light. In this way it is possible to produce a simultaneous, Fourier-transform spectrometer which has no moving parts.

A Wollaston prism, as previously mentioned in connection with the first aspect of the invention, is preferably used in the design of a Fourier-transform spectrometer having no moving parts. The birefringence in the Wollaston prism introduces a path difference between orthogonal polarisations. Incorporation of an extended aperture within the instrument allows the interferogram to be spatially rather than temporally dispersed at the output aperture. The use of a linear detector array means the entire interferogram can be sampled simultaneously, enabling a full spectrum to be obtained for a single-pulse of input light.

The incident input light is polarised at 45° to the optical axes of the Wollaston prism resulting in equal intensities for the horizontally and vertically polarised rays. A second 45° polariser placed after the Wollaston extracts a common polarisation component allowing subsequent constructive or destructive interference between the two rays. If either of the polarisers within the interferometer is rotated by 90° then the phase of the interferogram is reversed. Subtraction of two opposing phase interferograms allows suppression of the common background. The two interferograms may be obtained by separate measurement. Alternatively replacing the final polariser with a polarising beam splitter permits simultaneous recording of the two interferograms. Each lateral position of the Wollaston prism gives rise to a different path difference and is imaged onto a separate element in a linear detector array. Therefore, the interference pattern resulting from all possible path differences within the Wollaston is imaged across the detector array and can be recorded simultaneously.

A spectrometer in accordance with the invention will now be described by way of example, with reference to the accompanying drawings, in which.

Figure 10A:
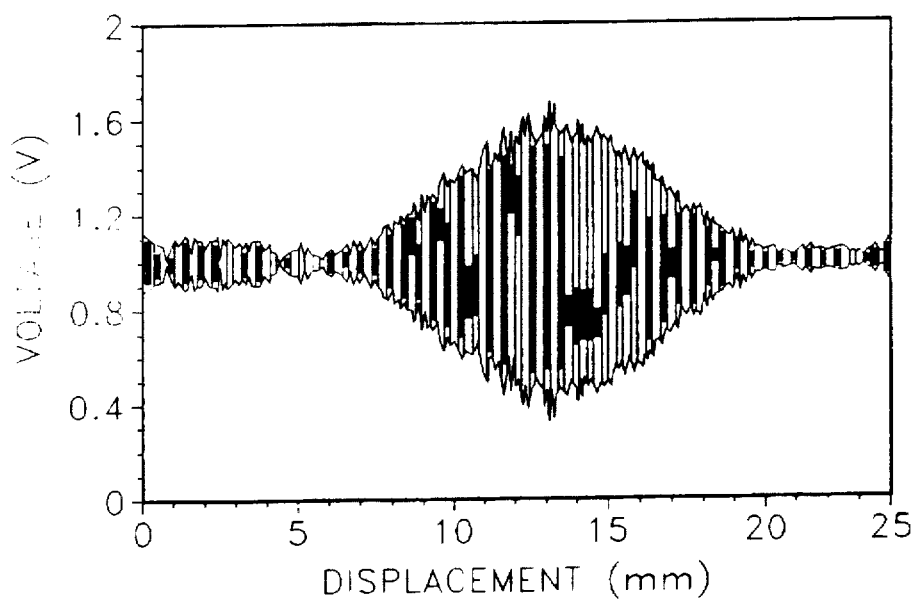
Figure 10B:
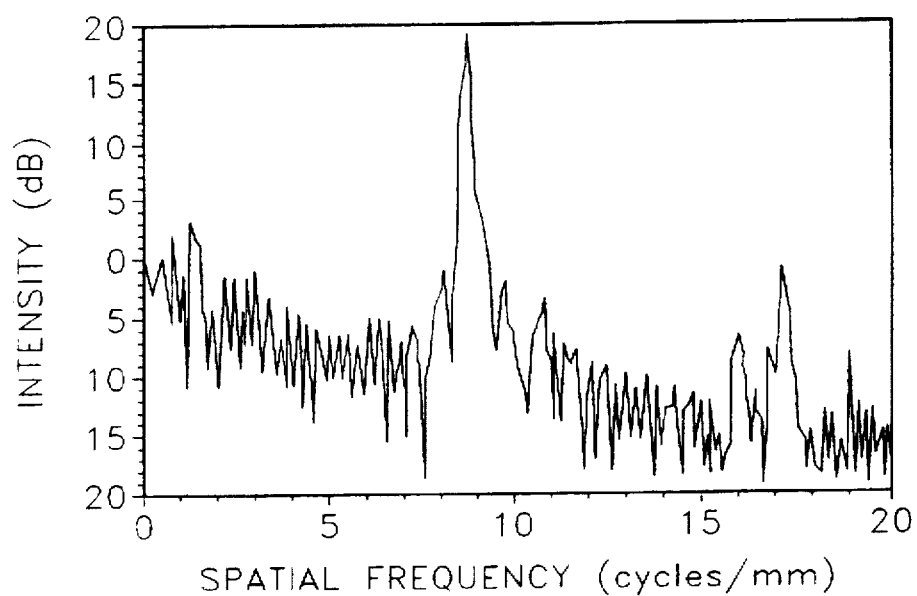
Figure 11:
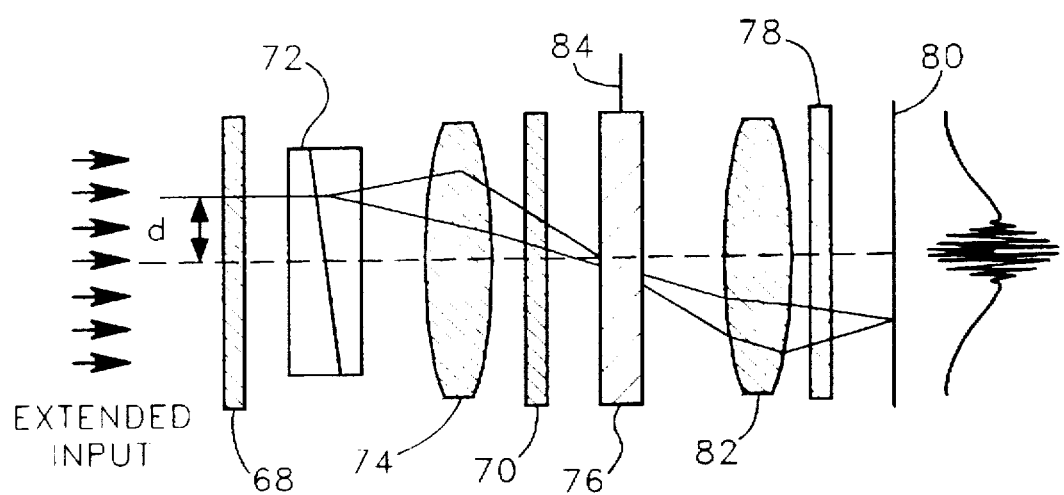

FIGS. 10(a) and 10(b) show an oscillogram of an interferogram and its Fourier-transform respectively, and FIG. 11 illustrates a single pulse autocorrelator.

DETAILED DESCRIPTION OF THE DRAWINGS

Figure 1:
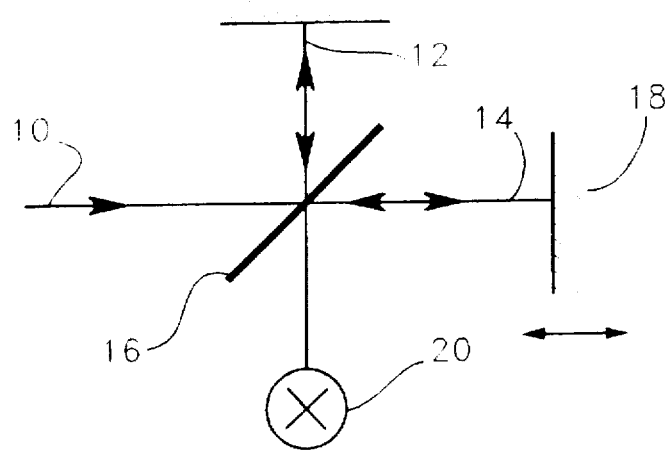
FIG. 1 illustrates the basic form of a conventional Fourier-transform spectrometer.

FIG. 1 shows a Fourier-transform spectrometer based around a Michelson interferometer. The input light 10 is split into the two arms 12 and 14 by the beam splitter 16. Moving the mirror 18 varies the length of arm 14 relative to that of arm 12 so as to produce an interferogram in the output at the detector 20.

Figure 2:
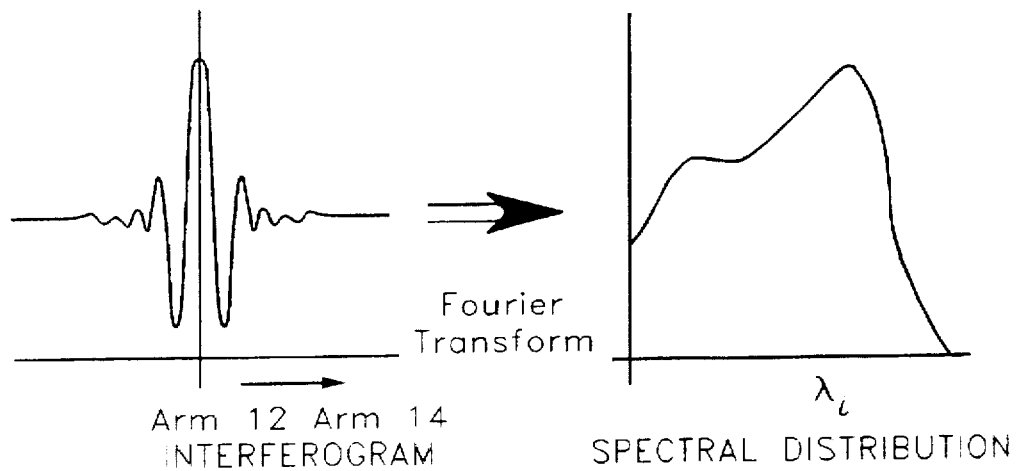
FIG. 2 shows graphically an interferogram and its Fourier transform.

FIG. 2 shows the spectral distribution pattern obtained by performing a Fourier-transform on a typical output from the detector 20 of FIG. 1.

Figure 3:
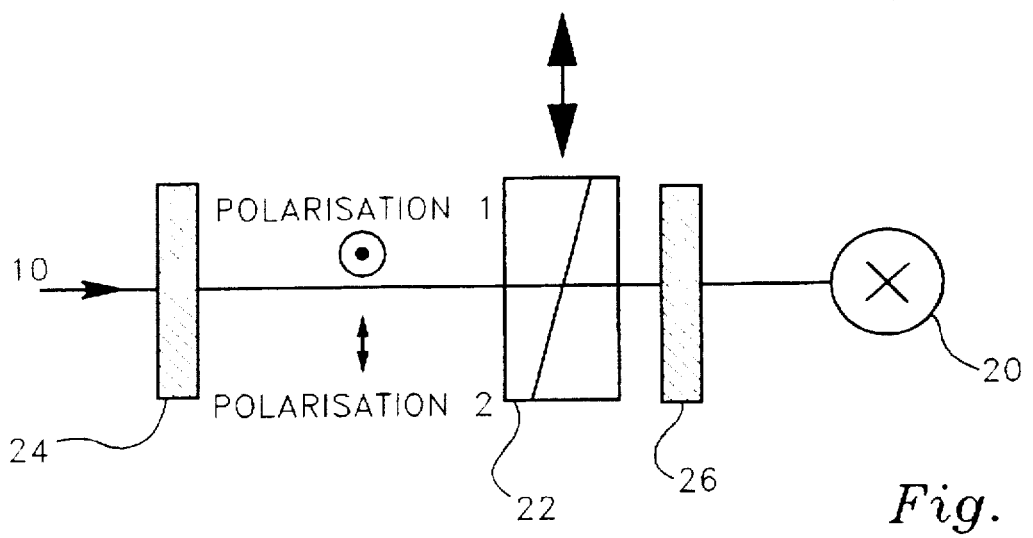
FIG. 3 illustrates a Fourier-transform spectrometer based on a birefringent optical component.

FIG. 3 shows how, instead, a Wollaston prism 22 can be positioned in a light path between two polarisers 24 and 26 to effect a path difference between the two polarisations as seen by the detector 20. Each of the polarisers 24,26 is orientated to polarise the incident light at 45° to the optical axis and translation of the prism 22 introduces a path difference between the beams of differing polarisations.

Figure 4:
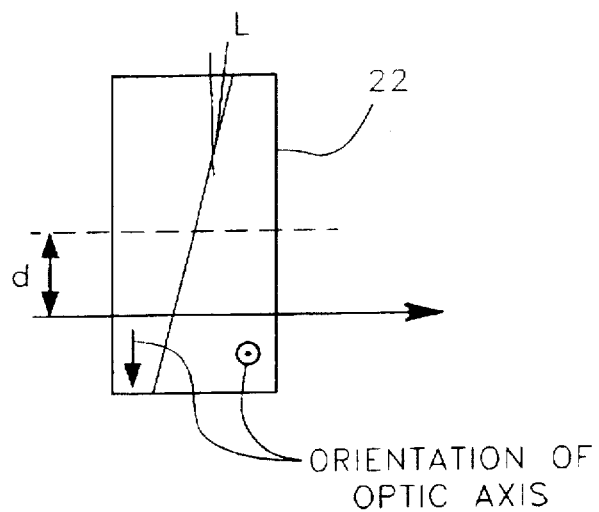
FIG. 4 illustrates a Wollaston prism.

If $\phi$ is the internal angle of the Wollaston prism interface and d is the lateral displacement of the prism 22, as shown in FIG. 4, the path difference D is given by $$D = 2d(n_e - n_o)\tan\phi$$

where $n_e$ and $n_o$ are the extraordinary and ordinary refractive indices of the birefringent prism.

Figure 5:
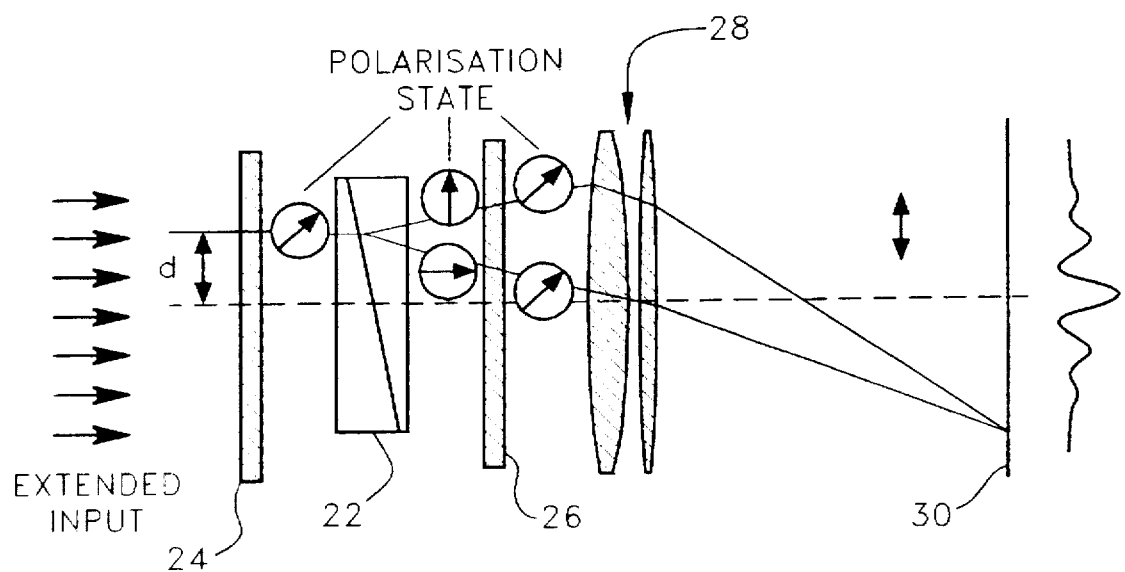
FIG. 5 illustrates how a simultaneous Fourier-transform spectrometer having no moving parts can be constructed.

FIG. 5 indicates the polarisation states of the light passing through the system and shows the manner in which a spectrometer with no moving parts can be constructed.

Figures 6, 6A:
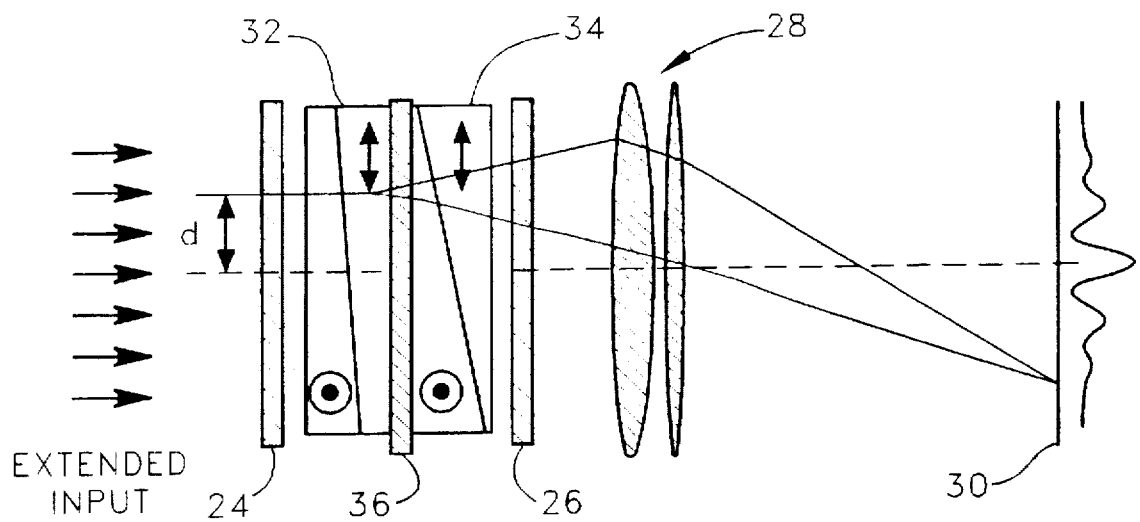
FIG. 6 illustrates a construction of one embodiment of a spectrometer incorporating the features of FIG. 4 and FIG. 5.
FIG. 6a is an equation for field angle related to FIG. 6.

In FIGS. 5 and 6 the first polariser 24 is set to give equal intensity of light for the fast and slow polarised beams with respect to the birefringent component. For a polarised input, greater efficiency is obtainable by using a half-wave plate to rotate the polarisation to the desired orientation.

The illustrated birefringent component is a Wollaston prism 22. On transmission through the Wollaston prism 22, the two polarisations are both refracted by small angles in opposite senses. Therefore, the incorporation of a lens system 28 also ensures that both polarisations are imaged onto the same element on the detector array 30. The purpose of the lens system 28 is to image the plane of the beam splitting points onto the detector 20, thus ensuring that each lateral position on the Wollaston prism 22 (and hence each path difference) is imaged to a different element in the detector array 30. For a single Wollaston prism 22, the effective splitting points for the rays corresponding to the two polarisations lie in a plane inclined to the exit face of prism. The angle of the plane is given by:

$$\text{Angle of plane} = \frac{n_e - n_o}{2n_e n_o}\phi$$

where $\phi$ is the internal angle of the Wollaston prism.

The angle of the plane can be significantly reduced, as shown in FIG. 6, by replacing the single Wollaston prism with a matched prism pair 32,34 with their internal angles arranged in opposite senses. A double Wollaston prism design ensures that the effective splitting plane for the two polarisations lies perpendicular to the optical axis of the instrument. This eases the problem of imaging the two polarisations onto the detector array 30. The second polariser 26 extracts a common polarisation component from the fast and slow polarised beams, enabling an interferogram to be recorded by the detector array 30. As with the other techniques, a Fourier-transform of the interferogram gives the spectral distribution of the incident light.

The angular acceptance of the Wollaston prism can be significantly increased by introducing an achromatic half-wave plate 36 between the two Wollaston prisms as also shown in FIG. 6. This allows for a large range of input angles for the incident light. The useful field angle for a wide angle Wollaston prism is approximately given by FIG. 6a, where dt is the difference in thickness between the Wollaston prisms, and W is the wavelength of the transmitted light.

Using a combination of Wollaston prisms 32, 34 and half-wave plate 36, a compensated wavelength range from 350 to 1050 nm is achievable. For example, a 20 mm aperture double Wollaston prism, made from quartz with an internal prism angle of 20°, gives a path difference of 350 um, resulting in a resolution of 570 GHz. Coupled with a 2048 element detector, this results in a short wavelength limit of 349 nm. This fits well with the optical transmission of the system, giving an overall spectral range from 350 to 1050 nm. For use in the infra red, it would be necessary to dispense with the halfwave plate and use a standard Wollaston prism design. The long wavelength transmission of the instrument would then be limited by the optical transmission limit of the Wollaston prism, which for magnesium fluoride is 7.5 um.

Figure 7:
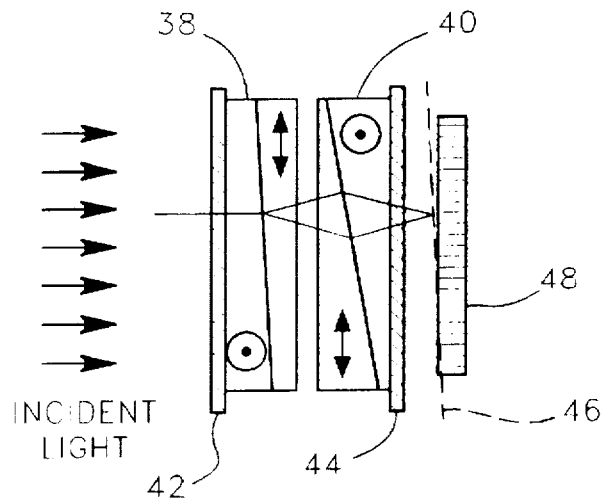
FIG. 7 illustrates a further embodiment of spectrometer.

FIG. 7 shows an embodiment of the spectrometer which removes the need for an imaging lens. Two Wollaston prisms 38,40 of different splitting angles are used with the polarisers 42,44 aligned at 45° to the optical axes of two prisms 38,40. Typical splitting angles used are 1.30° for the first prism 38 and 2.1° for the second prism 40. The Wollaston prisms 38,40 localise the interference fringes onto a plane 46 behind the prism pair, so that sighting of the detector array 48 on this plane records the interferogram directly. An example of a suitable detector array is a two dimensional CCD array.

Figure 8:
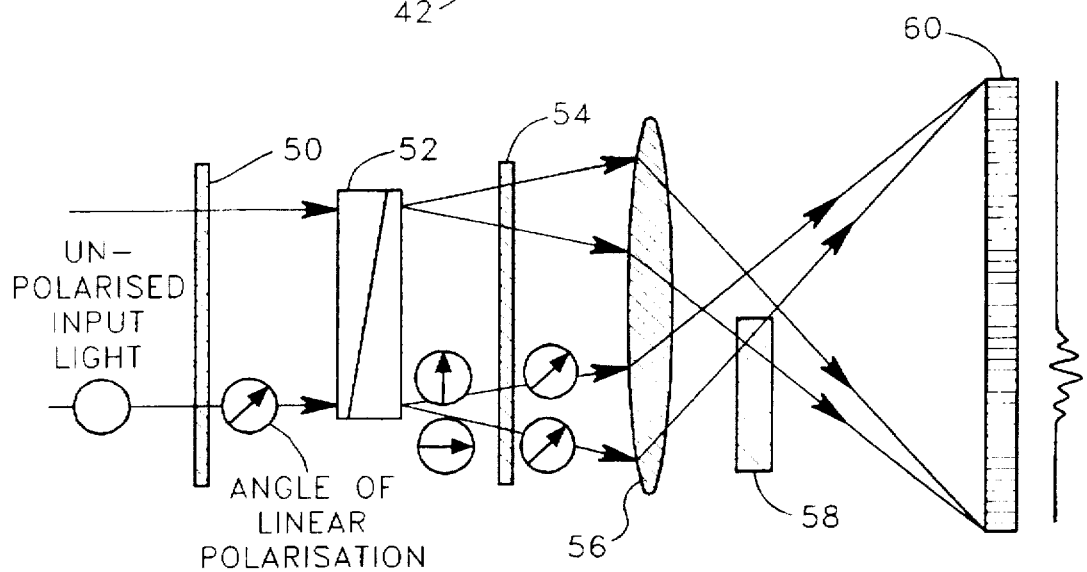
FIG. 8 illustrates an embodiment of the spectrometer in the form of a dispersive Fourier-transform spectrometer.

FIG. 8 shows a further embodiment of dispersive Fourier-transform spectrometer. Unpolarised input light passes through a polariser 50 set to polarise at 45° to the optical axis. The polarised light passes through a Wollaston prism 52 and a further polariser 54. The polariser 54 is also set to polarise at 45°. The two arms of the spectrometer are spatially separated in the back focal plane of an imaging lens 56. A sample 58 is positioned in one of the spectrometer arms. Each wavelength component within the interferogram is displaced by an amount dependent on the optical thickness of the sample 58. The wavelength transmission and refractive index of the sample 58 can be deduced by examination of the interferogram produced at a linear photodiode array 60.

Figure 9:
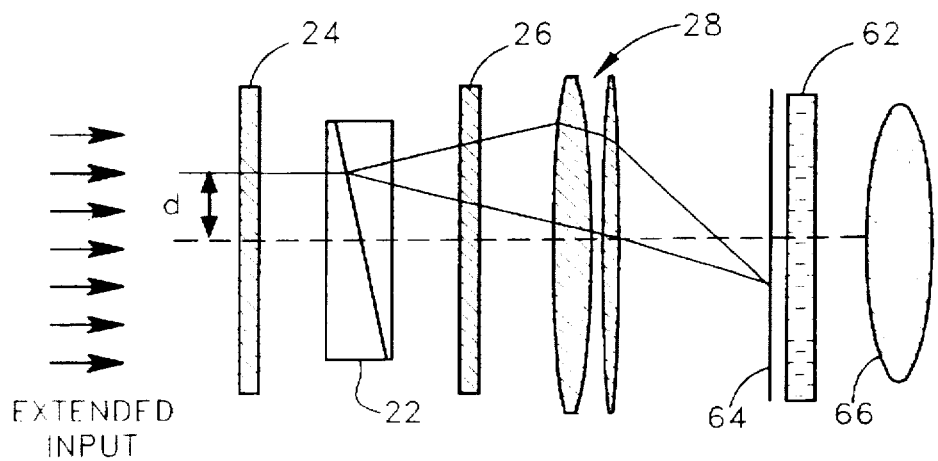
FIG. 9 illustrates an embodiment of the spectrometer using a single detector.

FIG. 9 shows a further embodiment of the spectrometer in which a transmission mask 62 is used. The spectrometer is identical to that shown in FIG. 5, having polarisers 24,26, Wollaston prism 22 and lens system 28. The detector array 30 is replaced by a transmission, or correlation, mask 62 at the transform plane 64. The light transmitted through the mask 62 is related to the correlation of the spectral distribution of input light with a predefined spectral signature. A large area detector 66 detects the output from the mask 62.

Results

In a Fourier-transform spectrometer based on the principles outlined above, the Wollaston prism is fabricated from quartz with a 20 mm aperture and a deviation angle of 0.5° giving a maximum path difference of ±87 um. The localised fringe plane within the Wollaston is imaged onto the detector array using a lens pair working at their design conjugates. The magnification is such that the full width of the Wollaston is imaged onto the 25 mm wide array. The polarisers are simple polaroid sheets and are held on either side of the Wollaston prism. The linear detector is a 1024 element clocked photodiode array, with an update rate of 25 msec.

The data may be read into a microcomputer incorporating a Maths Coprocessor. Construction of a 1024 point Fourier-transform takes 400 msec and facilities exist for apodisation of the input data and subsequent spectral analysis of the transformed data.

FIGS. 10(a) and 10(b) show an interferogram and transformed spectrum resulting from a quartz iodide lamp source in transmission through a red interference filter centered at 680 nm. As with our other results the centre wavelength and the bandwidth agree with the external calibration measurements to within 1 nm.

The invention has many applications, but particularly in the field of pulsed laser diagnostics.

The simultaneous operation of the instrument makes it suitable for analysis of "single shot" experiments (unlike a traditional Fourier-transform instrument, which requires a continuous input). For example, the spectral content of a low repetition rate pulsed-laser system could be analysed on a pulse-by-pulse basis using an instrument of this kind. In addition to spectral information, temporal information could also be obtained. Traditional autocorrelators based on Michelson interferometer types of arrangements require a repetitive train of pulses.

An adaptation of an instrument embodying the invention is shown in FIG. 11. The autocorrelator shown in FIG. 11 has two polarisers 68,70 set to polarise at 45°, a Wollaston prism 72 and an imaging lens 74 placed between the output from the Wollaston prism 72 and the second polariser 70. The inclusion of a non-linear crystal 76 and blocking, or fundamental, filter 78 between the Wollaston prism 72 and the detector 80 enables a "single-shot" temporal autocorrelation of the laser pulse to be recorded. A further imaging lens 82 is placed between the crystal 76 and blocking filter 78 to image the light from the crystal 76 onto the filter. A wavemeter detector 84 is placed at the crystal position.

The invention can also serve as a simultaneous Fourier-transform spectrometer with no moving parts.

The all-solid-state construction and common optical path offers high stability for the optical path difference between the two "arms" of the interferometer. This is of particular importance in the visible region of the spectrum where the wavelength is short.

The compact construction devoid of moving parts enables an optical head approximately 10 cm long to be designed.

Interchangeable Wollaston prisms enable a variety of resolution, wavelength ranges to be analysed.

Fourier-transform spectrometers have a wide variety of applications, including diagnostics tools within the food processing industry, e.g., grain assessment and milk quality measurements.

The invention thus provides a Fourier-transform spectrometer featuring:

no moving parts. There is therefore no requirement for precision translation stages or an in-built calibration laser.

simultaneous measurement of signals corresponding to all path differences. Therefore rapid response time is obtainable.

all optical components mounted on the same axis. This gives ease of alignment and compact design and possible head size of less than 10 cm×4 cm×4 cm.

both polarisation components follow the same physical path within the instrument. Therefore the instrument is not affected by air currents or external vibrations.

path difference determined by solid quartz prism. Therefore path differences are more accurate and reproducible.

interferogram is spacially displayed, allowing direct spectral autocorrelation with test distribution (applications within optical computing).

The compact nature of the instrument coupled with its ability to record a single pulse of light makes it a useful instrument in many optical applications.

Direct access to the Fourier-plane allows spectral correlation without hardware computer power (see FIG. 9). A device incorporating the invention is thus ideally suited to spectral recognition, for example, of pollution monitoring, military applications and the like.

We claim:

1. A Fourier-transform spectrometer arrangement comprising an aperture through which light from an extended source passes, a birefringent optical component interposed between first and second polarisers, the polarisation axes of which are aligned so that they are positioned at substantially 45° to the optical axis of the birefringent optical component, characterised in that:

the birefringent optical component comprises a plurality of juxtapositioned birefringent prisms which are arranged to form therebetween at least two interfaces, the optic axis of each of said birefringent prisms which form each of said at least two interfaces being substantially perpendicular to each other and an internal angle of each of said interfaces being different with respect to one another and arranged such that a first of said at least two interfaces and a subsequent of said at least two interfaces are inclined in like senses to the light incident thereon, wherein light from the extended source passes through a first of said birefringent prisms, is caused to diverge by the first of said at least two interfaces, and after passing through a second of said birefringent prisms is caused to converge by the subsequent of said at least two interfaces so as to form a spatially dispersed interferogram on a detector array disposed proximate an exit face of a further of said birefringent prisms, thereby eliminating a need for an imaging lens.

2. A Fourier-transform spectrometer arrangement as claimed in claim 1, wherein said plurality of birefringent prisms comprise two pairs of contiguously juxtapositioned birefringent prisms, a first of the pair forming the first of said at least two interfaces, and a second of the pairs forming the subsequent interface.

3. A Fourier-transform spectrometer arrangement as claimed in claim 2, wherein the optic axis of each prism of each pair is reversed in one of the prisms of the pair as compared with the other of the prisms of the pair.

4. A Fourier-transform spectrometer arrangement as claimed in claim 2, further comprising a half-wave plate interposed between the said first and second prisms, an angular acceptance of the arrangement being substantially increased by the half-wave plate.

5. A Fourier-transform spectrometer arrangement as claimed in, claim 2 wherein said first pair and said second pair of birefringent prisms each form respectively first and second Wollaston prisms are Wollaston prisms.

6. A Fourier-transform spectrometer arrangement as claimed in claim 1, comprising means for rotating a polarisation of the one of the polarisers to effect phase reversal of the interferogram for suppression of a common background.

7. A Fourier-transform spectrometer arrangement as claimed in claim 1, wherein the second polariser is a polarising beam splitter to provide simultaneous recording of two antiphase interferograms.

8. A Fourier-transform spectrometer arrangement as claimed in claim 1, wherein a transmission mask is disposed in a plane where an interferogram is formed in place of said detector array, and a further detector is disposed on an obverse side of said transmission mask, so that light transmitted through said transmission mask is detected by said detector, which light is representative of a correlation of a spectral distribution of light from the extended source with transmission properties of the correlation mask.

9. A Fourier-transform spectrometer arrangement as claimed in claim 1, wherein the detector array comprises a plurality of detectors which serve in combination to record an entire interference pattern.

10. A Fourier-transform spectrometer arrangement as claimed in claim 1, wherein the detector array comprises a linear detector arrangement.

11. A Fourier-transform spectrometer arrangement comprising an aperture through which light from an extended source passes, a birefringent optical component interposed between first and second polarisers, polarisation axes of which are aligned so that they are positioned at substantially 45° to an optical axis of the birefringent optical component, such that light entering the arrangement exits to a detector array so as to form an interferogram thereon, and a non-linear crystal being interposed between said second polariser and the detector array to enable temporal autocorrelation of a laser pulse to be recorded.

12. A Fourier-transform spectrometer arrangement comprising an aperture through which light from an extended source passes, a birefringent optical component interposed between first and second polarisers, polarisation axes of which are aligned so that they are positioned at substantially 45° to an optical axis of the birefringent optical component, such that light entering the arrangement exits to a detector array so as to form an interferogram thereon, said arrangement arranged to receive a sample between the second polariser and the detector array, so that the sample is illuminated only with light at one polarisation emerging from the birefringent component, to provide for a determination of a wavelength transmission and refractive index of the sample by examination of an interferogram produced by the detector array.

* * * * *